(12) United States Patent
Mitchell

(10) Patent No.: US 8,184,721 B2
(45) Date of Patent: May 22, 2012

(54) RECURSIVE FILTERING OF A VIDEO IMAGE

(75) Inventor: Arthur Mitchell, Winchester (GB)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1342 days.

(21) Appl. No.: 11/799,500

(22) Filed: May 2, 2007

(65) Prior Publication Data

US 2007/0280352 A1 Dec. 6, 2007

(30) Foreign Application Priority Data

Jun. 2, 2006 (GB) .................................. 0610972.2

(51) Int. Cl.
*H04N 7/12* (2006.01)

(52) U.S. Cl. .................................................. 375/240.29

(58) Field of Classification Search ........................ None
See application file for complete search history.

(56) References Cited

U.S. PATENT DOCUMENTS

| | | | |
|---|---|---|---|
| 4,723,166 A | 2/1988 | Stratton | |
| 4,794,454 A | 12/1988 | Sugiyama et al. | |
| 6,115,502 A * | 9/2000 | De Haan et al. | 382/260 |
| 6,310,982 B1* | 10/2001 | Allred et al. | 382/260 |
| 6,847,408 B1 | 1/2005 | Webb | |
| 7,903,901 B2* | 3/2011 | Mitchell et al. | 382/265 |
| 2001/0035916 A1* | 11/2001 | Stessen et al. | 348/607 |
| 2002/0076117 A1* | 6/2002 | Allred et al. | 382/261 |
| 2002/0130971 A1 | 9/2002 | Wischermann | |
| 2005/0128356 A1* | 6/2005 | Babonneau et al. | 348/607 |

FOREIGN PATENT DOCUMENTS

WO  WO 03/073750  9/2003

\* cited by examiner

*Primary Examiner* — Gilberto Barron, Jr.
*Assistant Examiner* — Shaun Gregory

(57) ABSTRACT

A method of recursive filtering of a video image includes storing an image 20 comprising picture elements. Luminance and chrominance weightings are assigned for weighting neighbouring picture elements to a picture element in a current image 10 and for the stored image 20. A sum of differences is calculated between weighted luminance and chrominance values of a picture element and neighbouring picture elements of a current image and of corresponding picture elements of the stored image. The sum of differences is normalized to control sensitivity to motion in the image to obtain a value of a proportional parameter K(x,y) for each picture element. The current image is recursively filtered using the proportional parameter K(x,y) corresponding to each picture element by adding together a proportion K(x,y) of each picture element of the image to a complementary proportion of each corresponding picture element of the previously stored image.

14 Claims, 2 Drawing Sheets

RECURSIVE FILTERING OF A VIDEO IMAGE

FIELD OF THE INVENTION

This invention relates to recursive filtering of a video image, and in particular to coded image performance enhancement by forward processing.

BACKGROUND OF THE INVENTION

It is well known, from, for example BBC Research Department Report "Video noise reduction" BBC RD 1984/7, N. E. Tanton et al, July 1984 (Tanton), that the random noise in a sequence of television or some other kinds of electronically generated images, e.g. scanned film, can be reduced by applying a recursive temporal filter which operates on each picture element, hereinafter abbreviated to 'pel'. It is beneficial to reduce noise levels prior to viewing images but also prior to processes that are sensitive to the presence of noise especially compression processes such as those defined by, but not limited to, MPEG specifications. In practice, noise control is among several important and valuable techniques employed in pre-processing elements inherent in modern compression hardware and software realisations of these specifications.

For each pel, indexed in an image by i, an output R(i) of a recursive filter is a sum of complementary proportions of a current image C(i) and a previous resultant output image S(i) such that proportions of C(i) and S(i) in the output R(i) are controlled by means of a fractional parameter K. If this notation is extended with a suffix 'f' to denote a frame, it is evident that the condition $S_f(i)=R_{f-1}(i)$ ensures a first order recursive temporal filter operation.

Hence, each pel in the result R(i) is expressed as:

$$R_f(i)=K.C_f(i)+(1-K).S_{f-1}(i)$$

$$0 \leq K \leq 1$$

Equation 1: Recursive Noise Reduction Calculation

Where:

$C_f(i)$ is the current input image under operation; i is the index to individual pels of that image and f is the index to the sequence of frames or complete images, $S_f(i)$ is a stored array of pels equal to the result $R_{f-1}(i)$ of the filter operation on the previous image and i is the index to individual pels of that image.

R(i) is the resulting pel field, which, after the operation, is copied to S(i) before the process is performed on a next image in a sequence and i is the index to individual pels of that image.

It is expected in the filter calculations that the index i of each of R(i), C(i) and S(i) is the same so that the pels are spatially co-located in each respective image. The index of pels in each image, i, may be defined in more than one-dimension; conventionally it is convenient to use two, corresponding to the commonly-used raster scanning of television images. Thus $R_f(i)$ becomes $R_f(x,y)$. The index f corresponds to the frame or temporal dimension.

K is the fractional parameter that controls a proportion of a current image C(x,y) to a proportion of a previous image S(x,y) used to make the current result R(x,y). In much of the prior art the parameter K does not change frequently with time, typically only once per complete image, and in extreme cases may be fixed indefinitely at one value. It may also be operated under direct manual control. Experience shows that this is not satisfactory for some image material.

The value of K is used to control a degree of filtering, and hence noise attenuation, and that attenuation increases as K tends toward 0.

At value K=0 there is no transmission of the incoming image C and the output is therefore "frozen". This is an ideal setting to process still images, where the absence of motion allows optimal filtering for noise reduction. In the presence of motion, however, the setting of K=0 is, in general, far from ideal.

At K=1 there is no filtering at all and the output is identically equal to the input and no noise reduction is achieved.

This known technique has some limitations. Objects in motion captured in successive images cause their respective pels to change position in the image and thus their index (x,y). Motion leads to changes in the position, i.e. lateral movement, or attitude, i.e. rotational movement, of recognisable objects in the image, even when there is no camera movement. Changes in object position are also caused by camera movement such as panning or tilting, or both, and changes in object position and scale caused by zooming, i.e. changes in focal length of the camera lens. In all these cases the filter described above will therefore add together pels in successive images whose indices (x,y) no longer correspond to the same part of such moving objects and consequently motion will be confused with noise and the filter will reduce the differences between successive images caused by motion as if it were noise. As a result, viewed images tend to blur for small amounts of movement and larger motion tends to create ghosts of any moving objects, substantially compromising the image with artefacts. The essence of the problem is an inability to discriminate reliably between noise and motion, in that small amounts of motion can be difficult to distinguish from noise.

To reduce unwanted artefacts the value of K can be defined on a per pel basis, i.e. K(x,y), from information derived from the pel C(x,y) being processed and the surrounding pels. The value of K(x,y) can be derived from the temporal difference between co-located pels, however this produces artefacts because this local difference is a function both of sought-after motion and noise in the image. To discriminate between noise and motion requires measurement and subsequent exploitation of differing statistical properties of the motion and the noise.

To gain some immunity to the noise and get a better estimate of true motion, Tanton proposes a two-dimensional low pass spatial filter to operate on a rectangular array of pels around the pel C(x,y) being processed.

The method proposed by Tanton estimates motion by considering a 5 by 5 area of luminance pels and averaging the difference between them and their spatially co-located pairs in a previous image frame. This seeks to average pel differences to increase noise immunity. However, this technique has some disadvantages in practice, arising from a search area chosen and an information type used to detect the motion.

The proposed rectangular search area is 5 by 5 pels and equal weight is given to each difference value. However, this makes the system over-sensitive to motion of some pels away from the pel under operation and results in inappropriate filtering in the vicinity of moving edges that causes a 'halo' effect of noise, particularly noticeable on slow-moving, diagonal edges with high contrast.

A second disadvantage is that areas of an image with low contrast and significant chromatic saturation tend to be filtered more harshly than is appropriate, causing blurring and ghosting, which appears as chrominance leaking into adjacent areas of the image. This is because no independent account is taken in the prior art of the behaviour of the chrominance in the image in determining the value of K.

It is an object of the present invention at least to ameliorate the aforesaid shortcomings in the prior art.

It is another object of the present invention to provide means whereby discrimination between noise and motion may be improved.

It is a further object of this invention that the value of K may be varied pel-by-pel appropriately to reduce noise but also to suppress unwanted artefacts, so that K becomes K(x,y).

SUMMARY OF THE INVENTION

According to a first aspect of the present invention there is provided a method of recursive filtering of a video image comprising the steps of: storing an image to comprise stored picture elements S(x,y); providing luminance and chrominance weightings for weighting neighbouring picture elements to a picture element to be processed; calculating a sum σ(x,y) of differences between luminance and chrominance values of a picture element C(x,y) and neighbouring picture elements of a current image and of corresponding picture elements S(x,y) of the stored image, weighted by the luminance and chrominance weightings; normalising the sum of absolute differences with a normalising coefficient λ to control sensitivity to motion to form a proportional parameter K(x,y)=λσ(x,y); recursively filtering the image using a value of the proportional parameter K(x,y) corresponding to each picture element by adding together a proportion K(x,y) of each picture element C(x,y) of the image to a complementary proportion 1−K(x,y) of each corresponding picture element S(x,y) of the previously stored image.

Conveniently, for recursive filtering an interlaced video image, the method comprises a further initial step of interpolating luminance and chrominance values of a current field to correlate spatially with picture element locations in a field interlaced with the current field wherein the step of providing weightings includes providing weightings to the interpolated luminance and chrominance values.

Advantageously, the step of calculating the sum σ(x,y) includes adding a proportion α of the chrominance weighted information to the weighted luminance information for each picture element and neighbouring picture element.

Conveniently, the step of calculating the sum σ(x,y) comprises calculating a sum of absolute differences.

Optionally, the step of calculating the sum σ(x,y) comprises calculating a sum of squares of the differences between chrominance and luminance of the picture element and surrounding picture elements.

Optionally, the step of calculating the sum σ(x,y) comprises calculating a positive square root of the sum of squares of the differences between chrominance and luminance of the picture element and surrounding picture elements Advantageously, the step of normalising the sum of differences comprises setting a minimum value b of the normalising parameter such that K(x,y)=λσ(x,y)+b.

Conveniently, the sum of differences is calculated using the equation:

$$\sigma(x, y) = \sum_{m=-2}^{2} \sum_{n=-2}^{2} W_{luma}(m, n) \cdot ABS(C_{luma}(x+m, y+n) - S_{luma}(x+m, y+n)) + \alpha \cdot W_{chroma}(m, n) ABS(C_{chroma}(x+m, y+n) - S_{chroma}(x+m, y+n))$$

where:
m and n are offsets in the x and y directions respectively over which neighbouring picture elements are taken into account;
$W_{luma}(m,n)$ and $W_{chroma}(m,n)$ are the luminance and chrominance weightings respectively applied to the picture element and neighbouring picture elements over a range m=−2 to +2 and n=−2 to +2;
C(x,y) is the luminance and chrominance values of the (x,y) picture element of the current image; and
S(x,y) is the luminance and chrominance values of the (x,y) picture element of the stored image.

According to a second aspect of the invention there is provided a recursive filter system for a video image comprising: storing means arranged to store an image to comprise stored picture elements S(x,y); luminance and chrominance weightings for weighting neighbouring picture elements to a picture element to be processed; calculating means arranged to calculate a sum σ(x,y) of differences between luminance and chrominance values of a picture element C(x,y) and neighbouring picture elements of a current image and of corresponding picture elements S(x,y) of the stored image, weighted by the luminance and chrominance weightings; normalising means arranged to normalise the sum of absolute differences with a normalising coefficient λ to control sensitivity to motion to form a proportional parameter K(x,y)=λσ(x,y); recursively filtering means arranged recursively to filter the image using a value of the proportional parameter K(x,y) corresponding to each picture element by adding together a proportion K(x,y) of each picture element C(x,y) of the image to a complementary proportion 1−K(x,y) of each corresponding picture element S(x,y) of the previously stored image.

Advantageously, for recursive filtering an interlaced video image, the recursive filter system further comprises interpolating means arranged initially to interpolate luminance and chrominance values of a current field to correlate spatially with picture element locations in a field interlaced with the current field and the weighting means is arranged to provide weightings to the interpolated luminance and chrominance values.

Conveniently, the calculating means is arranged to add a proportion a of the chrominance weighted information to the weighted luminance information for each picture element and neighbouring picture element.

Optionally, the calculating means is arranged to calculate a sum of absolute differences.

Optionally, the calculating means is arranged to calculate a sum of squares of the differences between chrominance and luminance of the picture element and surrounding picture elements.

Optionally, the calculating means is arranged to calculate a positive square root of the sum of squares of the differences between chrominance and luminance of the picture element and surrounding picture elements Advantageously, the normalising means is arranged to set a minimum value b of the normalising parameter such that $K(x,y)=\lambda\sigma(x,y)+b$.

Conveniently, the calculating means is arranged to use the equation:

$$\sigma(x, y) = \sum_{m=-2}^{2} \sum_{n=-2}^{2} W_{luma}(m, n) \cdot ABS(C_{luma}(x+m, y+n) - S_{luma}(x+m, y+n)) + \alpha \cdot W_{chroma}(m, n) ABS(C_{chroma}(x+m, y+n) - S_{chroma}(x+m, y+n))$$

where:

m and n are offsets in the x and y directions respectively over which neighbouring picture elements are taken into account;

$W_{luma}(m,n)$ and $W_{chroma}(m,n)$ are the luminance and chrominance weightings respectively applied to the picture element and neighbouring picture elements over a range m=−2 to +2 and n=−2 to +2;

C(x,y) is the luminance and chrominance values of the (x,y) picture element of the current image; and S(x,y) is the luminance and chrominance values of the (x,y) picture element of the stored image.

According to a third aspect of the invention, there is provided a computer program comprising code means for performing all the steps of the method described above when the program is run on one or more computers.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the accompanying drawings, in which.

Throughout the description, identical reference numerals are used to identify like parts.

DETAILED DESCRIPTION OF PREFERRED EMBODIMENTS

It is desirable to detect a degree of motion between images and derive a suitable value of K to produce good noise attenuation while avoiding the two problems noted above. In this invention specific attention is paid to the chrominance as well as the luminance.

Figure 1:
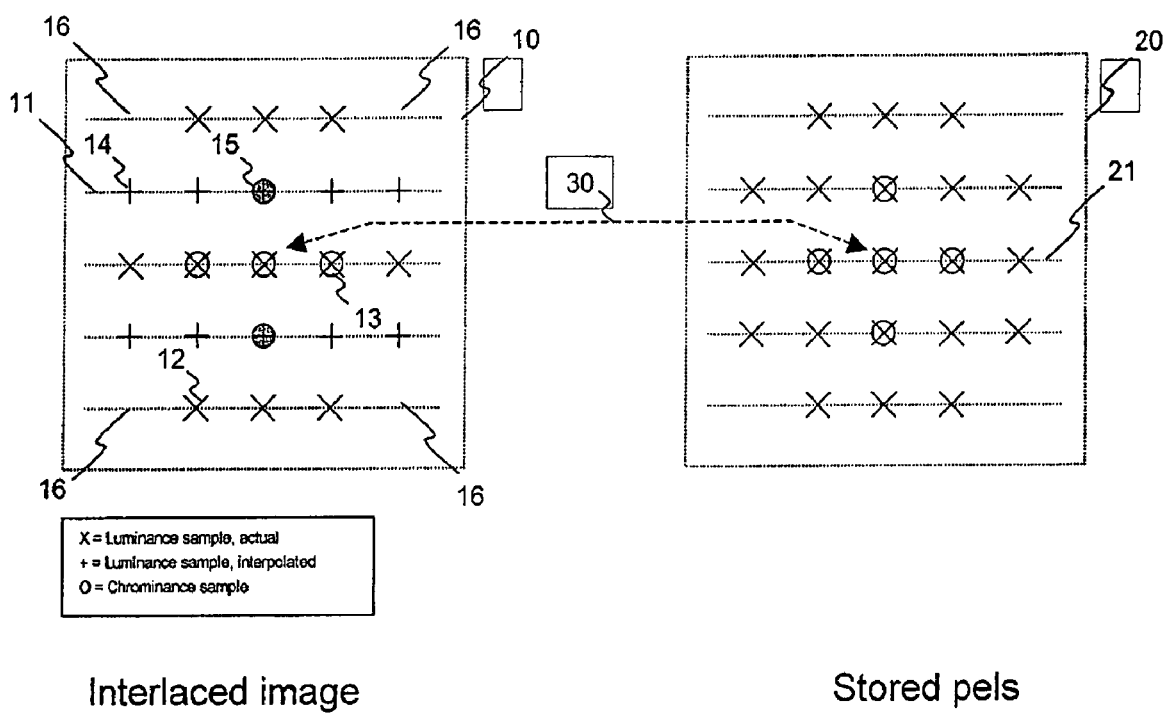
FIG. 1 is a diagrammatic representation of pels used in a search according to the invention.

FIG. 1 shows pel samples 12-15 used in the invention to determine localised activity, i.e. motion, when processing interlaced video images. The offset between alternating rows of pels indicates samples from opposing field within a same frame. It is important to note that there is a temporal offset between these fields.

Figure 2:
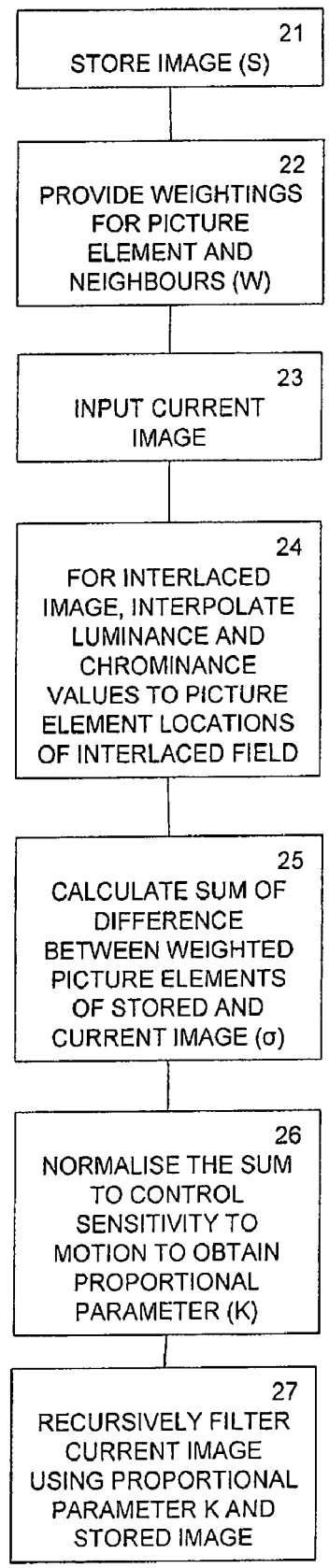
FIG. 2 is a flowchart of a method of recursive filtering a video image according to the invention.

Referring to FIGS. 1 and 2, a first block 10 of FIG. 1 depicts lines 11 of pel samples 12-15 in a picture currently being processed, i.e. C(i) in Equation 1. A second block 20 of FIG. 1 depicts lines of pel samples 21 in a picture stored, step 21, as a result of processing, i.e. S(i) in Equation 1.

Crosses 12 represent luminance samples, circles 13 represent reconstructed chrominance information such that a 4:2:2 structure commonly used to represent and transport video is interpolated to make a co-located red difference and blue difference sample. As such these chrominance samples contain a red and blue difference value. Plus signs 14 and shaded circles 15 represent information interpolated, step 24, from the current field of the source picture to correlate spatially with samples from the interlaced field.

To address the 'halo' effect a weighting factor is applied, step 22, to each pel; an example of a suitable set of values is given in Table 1, in which the coordinates of a pet being processed are 0,0 and values of m and n vary between −2 and +2. Note that four luminance pels 16 are omitted from the diagram in FIG. 1 at the extreme diagonals from the pet under operation because the weighting factor for these pels is zero.

TABLE 1

| Pel weighting factors | | | | | |
|---|---|---|---|---|---|
| | −2 | −1 | 0 | 1 | 2 |
| Luminance | | | | | |
| −2 | 0 | 0.75 | 0.85 | 0.75 | 0 |
| −1 | 0.75 | 0.9 | 1 | 0.9 | 0.75 |
| 0 | 0.85 | 1 | 1 | 1 | 0.85 |
| 1 | 0.75 | 0.9 | 1 | 0.9 | 0.75 |
| 2 | 0 | 0.75 | 0.85 | 0.75 | 0 |
| Chrominance | | | | | |
| −2 | 0 | 0 | 0 | 0 | 0 |
| −1 | 0 | 0 | 0.7 | 0 | 0 |
| 0 | 0 | 0.7 | 0.7 | 0.7 | 0 |
| 1 | 0 | 0 | 0.7 | 0 | 0 |
| 2 | 0 | 0 | 0 | 0 | 0 |

The second issue of chrominance smearing is dealt with by the inclusion of five chrominance samples into the calculation.

A ratio of luminance sample to chrominance sample information is chosen to produce satisfactory results without being biased too heavily in favour of strongly saturated images where the colour difference signals could cause a disproportionate motion signal.

A same calculation is possible in progressive video, only the spatio-temporal position of the samples change. There is no need to interpolate pel information in this case.

Block 10 of FIG. 1 has a further optimisation in that the luminance samples on the interlaced field are interpolated from the samples of the current field. This optimisation is made to lower information transfer from an image store which simplifies the system and reduces the demands on speed and bandwidth to that memory.

A current image is input, step 23, and the arrow 30 in FIG. 1 indicates a pel instantaneously being processed. Hence the activity/motion value $\sigma(x,y)$ is calculated, step 25, by the following equation using a sum of absolute differences between stored pels S(x,y) and current pels C(x,y):

$$\sigma(x, y) = \sum_{m=-2}^{2} \sum_{n=-2}^{2} W_{luma}(m, n) \cdot ABS(C_{luma}(x+m, y+n) - S_{luma}(x+m, y+n)) + \alpha \cdot W_{chroma}(m, n) ABS(C_{chroma}(x+m, y+n) - S_{chroma}(x+m, y+n))$$

Equation 2: Calculation of Parameter σ(x,y) Using a
Sum of Absolute Differences, SAD Where C and S are the pel fields being processed; x & y are indices to the pel position being processed and m & n are offsets from this position of the pel that describe a region over which an activity factor calculation is performed. $W_{luma}(m,n)$ and $W_{chroma}(m,n)$ are weighting matrices from Table 1 and α is a weighting parameter which can be used to balance a relative effect that luminance and chrominance have on a value of σ(x,y). Alternatively, the tables for $W_{luma}(m,n)$ and $W_{chroma}(m,n)$ may also include such balancing.

In Equation 2, the value of σ(x,y) is always positive and is calculated in the example given using a sum of absolute differences, SAD. The use of other algorithms to calculate σ(x,y) is possible, for example, the sum of squares of differences could be an equally appropriate alternative as could the positive root of the mean of the squares of the differences.

The calculated value σ(x,y) can then be scaled and/or normalised, step 26, by a coefficient, λ, to give control of the sensitivity to motion, larger values of λ resulting in a larger activity figure. The resulting product of λ and σ(x,y) determines the value of K such that at a certain degree of activity K reaches 1 and no recursion is applied. To avoid unwanted image defects the condition K=0 is suppressed so when σ(x,y)=0, K is set to a minimum value b.

It will be noted that σ(x,y) will need to be normalised since it is the sum of n pel difference values. Since this system will be implemented using integer arithmetic, with a finite resolution, these formulae assume that normalisation is not performed until after the scaling by λ.

The value of K from Equation 1 can then be expressed as follows, $$K(x,y) = a \cdot \lambda \cdot \sigma(x,y) + b$$

The values a & b define a range of operation of K. K will normally be operated from 1 downward to provide either no filtering at 1 or increasing filtering as K tends to b.

The derived value of K is used recursively to filter, step 27, the current image.

It will be understood that at a boundary of an image, where there are not further pels surrounding a pel being processed on all sides thereof, first or last pels in a row may be repeated horizontally and top and bottom rows may be duplicated to provide suitable source data for the invention.

It will be further understood that for a first image, or following a change in a sequence of images such as an abrupt scene change, the value of K may be set to 1 for the duration of that frame. This has an effect of loading the memory with the new picture or scene and avoids any noticeable lag in responding to such a change. Such a change in picture can be detected by subtracting all co-located pels in two pictures from each other one frame in advance of the noise-reducing circuit and summating their absolute difference. A summated value above a predetermined threshold can be used to cause the system to force K equal to 1.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example microwave or infrared. The series of computer instructions can constitute all or part of the functionality described above, and can also be stored in any memory device, volatile or non-volatile, such as semiconductor, magnetic, optical or other memory device.

Although the present invention has been described with reference to preferred embodiments, workers skilled in the art will recognize that changes may be made in form and detail without departing from the spirit and scope of the invention.

I claim:

1. A method of recursive filtering of a video image comprising:
   a. storing, using a computer system, an image to comprise stored picture elements S(x,y);
   b. providing, using the computer system, luminance and chrominance weightings for weighting neighbouring picture elements to a picture element to be processed;
   c. calculating, using the computer system, a sum σ(x,y) of differences between luminance and chrominance values of a picture element C(x,y) and neighbouring picture elements of a current image and of corresponding picture elements S(x,y) of the stored image, weighted by the luminance and chrominance weightings, wherein the sum of differences is calculated using the equation:

$$\sigma(x, y) = \sum_{m=-2}^{2} \sum_{n=-2}^{2} W_{luma}(m, n) \cdot \text{ABS}(C_{luma}(x + m, y + n) - S_{luma}(x + m, y + n)) + \alpha \cdot W_{chroma}(m, n) \text{ABS}(C_{chroma}(x + m, y + n) - S_{chroma}(x + m, y + n))$$

where: m and n are offsets in the x and y directions respectively over which neighbouring picture elements are taken into account, $W_{luma}(m,n)$ and $W_{chroma}(m,n)$ are the luminance and chrominance weightings respectively applied to the picture element and neighbouring picture elements over a range m=−2 to +2 and n=−2 to +2, C(x,y) is the luminance and chrominance values of the (x,y) picture element of the current image, and S(x,y) is the luminance and chrominance values of the (x,y) picture element of the stored image;
   d. normalizing, using the computer system, the sum of absolute differences with a normalising coefficient λ to control sensitivity to motion to form a proportional parameter K(x,y)=λσ(x,y);
   e. recursively filtering, using the computer system, the image using a value of the proportional parameter K(x,y) corresponding to each picture element by adding together a proportion K(x,y) of each picture element C(x,y) of the image to a complementary proportion 1−K(x,y) of each corresponding picture element S(x,y) of the previously stored image.

2. A method as claimed in claim 1 for recursive filtering an interlaced video image, further comprising initially interpolating, using the computer system, luminance and chrominance values of a current field to correlate spatially with picture element locations in a field interlaced with the current field wherein the step of providing weightings includes providing weightings to the interpolated luminance and chrominance values.

3. A method as claimed in claim 1, wherein calculating the sum σ(x,y) includes adding, using the computer system, a proportion α of the chrominance weighted information to the weighted luminance information for each picture element and neighbouring picture element.

4. A method as claimed in claim 1, wherein calculating the sum σ(x,y) comprises calculating, using the computer system, a sum of absolute differences.

5. A method as claimed in claim 1, wherein calculating the sum σ(x,y) comprises calculating, using the computer system, a sum of squares of the differences between chrominance and luminance of the picture element and surrounding picture elements.

6. A method as claimed in claim 1, wherein calculating the sum σ(x,y) comprises calculating, using the computer system, a positive square root of the sum of squares of the differences between chrominance and luminance of the picture element and surrounding picture elements.

7. A method as claimed in claim 1, wherein normalising the sum of differences comprises setting, using the computer system, a minimum value b of the normalising parameter such that $K(x,y)=\lambda\sigma(x,y)+b$.

8. A non-transitory computer readable medium comprising computer program code, wherein the code, when executed by a computer system is configured for:
   a. storing an image to comprise stored picture elements $S(x,y)$;
   b. providing luminance and chrominance weightings for weighting neighbouring picture elements to a picture element to be processed;
   c. calculating a sum σ(x,y) of differences between luminance and chrominance values of a picture element C(x,y) and neighbouring picture elements of a current image and of corresponding picture elements S(x,y) of the stored image, weighted by the luminance and chrominance weightings, wherein the sum of differences is calculated using the equation:

$$\sigma(x, y) = \sum_{m=-2}^{2} \sum_{n=-2}^{2} W_{luma}(m, n) \cdot \text{ABS}(C_{luma}(x+m, y+n) - S_{luma}(x+m, y+n)) + \alpha \cdot W_{chroma}(m, n) \text{ABS}(C_{chroma}(x+m, y+n) - S_{chroma}(x+m, y+n))$$

where: m and n are offsets in the x and y directions respectively over which neiahbourinq picture elements are taken into account $W_{luma}(m,n)$ and $W_{chroma}(m,n)$ are the luminance and chrominance weightings respectively applied to the picture element and neighbouring picture elements over a range m=−2 to +2 and n=−2 to +2, C(x,y) is the luminance and chrominance values of the (x,y) picture element of the current image, and S(x,y) is the luminance and chrominance values of the (x,y) picture element of the stored image;
   d. normalising the sum of absolute differences with a normalising coefficient λ to control sensitivity to motion to form a proportional parameter $K(x,y)=\lambda\sigma(x,y)$;
   e. recursively filtering the image using a value of the proportional parameter K(x,y) corresponding to each picture element by adding together a proportion K(x,y) of each picture element C(x,y) of the image to a complementary proportion 1−K(x,y) of each corresponding picture element S(x,y) of the previously stored image.

9. A non-transitory computer readable medium as claimed in claim 8 for recursive filtering an interlaced video image, further comprising computer program code, when executed by the computer system, is configured for initially interpolating luminance and chrominance values of a current field to correlate spatially with picture element locations in a field interlaced with the current field wherein the step of providing weightings includes providing weightings to the interpolated luminance and chrominance values.

10. A non-transitory computer readable medium as claimed in claim 8, wherein calculating the sum σ(x,y) includes adding a proportion α of the chrominance weighted information to the weighted luminance information for each picture element and neighbouring picture element.

11. A non-transitory computer readable medium as claimed in claim 8, wherein calculating the sum σ(x,y) comprises calculating a sum of absolute differences.

12. A non-transitory computer readable medium as claimed in claim 8, wherein calculating the sum σ(x,y) comprises calculating a sum of squares of the differences between chrominance and luminance of the picture element and surrounding picture elements.

13. A non-transitory computer readable medium as claimed in claim 8 wherein calculating the sum σ(x,y) comprises calculating a positive square root of the sum of squares of the differences between chrominance and luminance of the picture element and surrounding picture elements.

14. A non-transitory computer readable medium as claimed in claim 8, wherein normalising the sum of differences comprises setting a minimum value b of the normalising parameter such that $K(x,y)=\lambda\sigma(x,y)+b$.

* * * * *

UNITED STATES PATENT AND TRADEMARK OFFICE
CERTIFICATE OF CORRECTION

| | | |
|---|---|---|
| PATENT NO. | : 8,184,721 B2 | Page 1 of 1 |
| APPLICATION NO. | : 11/799500 | |
| DATED | : May 22, 2012 | |
| INVENTOR(S) | : Mitchell | |

It is certified that error appears in the above-identified patent and that said Letters Patent is hereby corrected as shown below:

In Column 1, Line 47, delete "images," and insert -- images. --, therefor.

In Column 1, Lines 61-64, delete "conventionally...dimension." and insert the same on Line 60 after "dimension;" as the continuation of the paragraph.

In Column 3, Line 67, delete "elements" and insert -- elements. --, therefor.

In Column 5, Line 2, delete "elements" and insert -- elements. --, therefor.

In Column 6, Line 12, delete "pet" and insert -- pel --, therefor.

In Column 6, Line 15, delete "pet" and insert -- pel --, therefor.

In Column 7, Line 36, after "K(x,y)=α.λ.σ(x,y)+b" insert -- . --.

In Column 9, Line 44, delete "neiahbourinq" and insert -- neighbouring --, therefor.

In Column 10, Line 38, delete "claim 8" and insert -- claim 8, --, therefor.

Signed and Sealed this
Fourth Day of September, 2012

David J. Kappos
*Director of the United States Patent and Trademark Office*